(12) United States Patent
Schibsbye

(10) Patent No.: US 8,770,966 B2
(45) Date of Patent: Jul. 8, 2014

(54) MOULD ASSEMBLY WITH HINGE MECHANISM AND METHOD FOR CLOSING A MOULD ASSEMBLY

(75) Inventor: Karsten Schibsbye, Fredericia (DK)

(73) Assignee: LM Glasfiber A/S, Lunderskov (DK)

( * ) Notice: Subject to any disclaimer, the term of this patent is extended or adjusted under 35 U.S.C. 154(b) by 525 days.

(21) Appl. No.: 12/084,646

(22) PCT Filed: Nov. 7, 2006

(86) PCT No.: PCT/DK2006/000611
§ 371 (c)(1),
(2), (4) Date: Jun. 13, 2008

(87) PCT Pub. No.: WO2007/054088
PCT Pub. Date: May 18, 2007

(65) Prior Publication Data
US 2008/0277834 A1    Nov. 13, 2008

(30) Foreign Application Priority Data
Nov. 8, 2005 (DK) .................................. 2005 01539

(51) Int. Cl.
*B29C 33/26* (2006.01)
(52) U.S. Cl.
USPC ..... 425/442; 425/450.1; 425/451; 425/451.3; 425/451.5; 425/451.6
(58) Field of Classification Search
USPC ............. 425/450.1, 451, 451.3, 451.5, 451.6, 425/442
See application file for complete search history.

(56) References Cited

U.S. PATENT DOCUMENTS

| 2,984,867 A | * | 5/1961 | Van Houten et al. | ......... 425/385 |
| 3,147,324 A | | 9/1964 | Ward | |
| 4,083,671 A | * | 4/1978 | Niederst et al. | ............ 425/450.1 |

(Continued)

FOREIGN PATENT DOCUMENTS

| AT | 382 342 B | 2/1987 |
| DE | 3520 581 A1 | 12/1985 |

(Continued)

*Primary Examiner* — Amjad Abraham
(74) *Attorney, Agent, or Firm* — Nath, Goldberg & Meyer; Jerald L. Meyer; Sanjana Mangalagiri

(57) ABSTRACT

A mold assembly comprises a first (1) and a second mold part (2) said mold assembly further comprising a hinge mechanism optionally detachably connected to the two mold parts. The hinge mechanism has at least a first (5) and a second hinge axis (6) connected by means of at least one connectina arm and extending with a mutual distance substantially parallel to the two mold parts (1, 2) in the longitudinal direction of the mold so that the mold parts (1, 2) are pivotable with respect to each other between a first, open position, where the two mold parts (1, 2) are located adjacent each other with a mutual distance and with the openings of the two mold parts (1, 2) facing substantially upwards, and a second position, where the first mold part (1) is rotated around the first hinge axis (5) by means of a first drive means (7) so that the opening of said first mold part faces substantially to the side and towards the second mold part (2), and a third position, where the first mold part (1) is further rotated around the second hinge axis (6) by means of a second drive means (8) so that the opening of said first mold part faces substantially downward towards the opening of the second mold part (2).

9 Claims, 5 Drawing Sheets

(56) References Cited

U.S. PATENT DOCUMENTS

| | | | |
|---|---|---|---|
| 5,169,650 A * | 12/1992 | Topf | 425/190 |
| 6,569,273 B1 * | 5/2003 | Beadon | 156/91 |
| 2002/0187213 A1 * | 12/2002 | Durrant | 425/182 |
| 2004/0222562 A1 * | 11/2004 | Kirchner | 264/314 |

FOREIGN PATENT DOCUMENTS

| | | |
|---|---|---|
| DK | 171948 B1 | 8/1997 |
| DK | 2004 00032 U3 | 5/2005 |
| GB | 2 181 386 A | 4/1987 |
| WO | 2004/043679 A1 | 5/2004 |

* cited by examiner

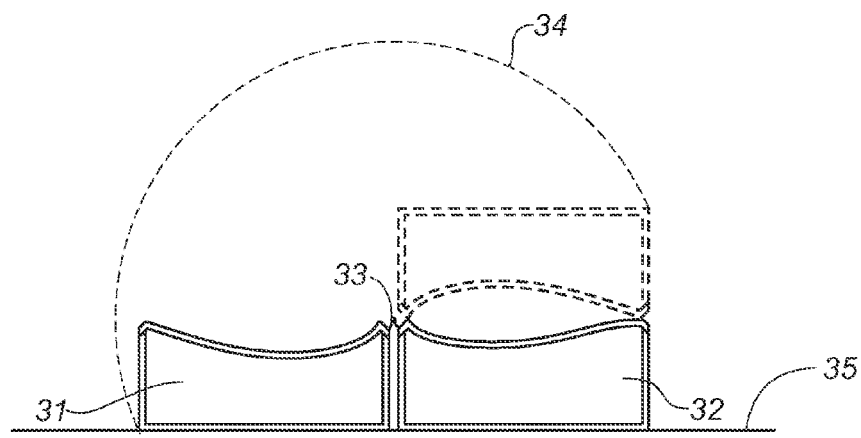
*Prior art*  Fig. 2
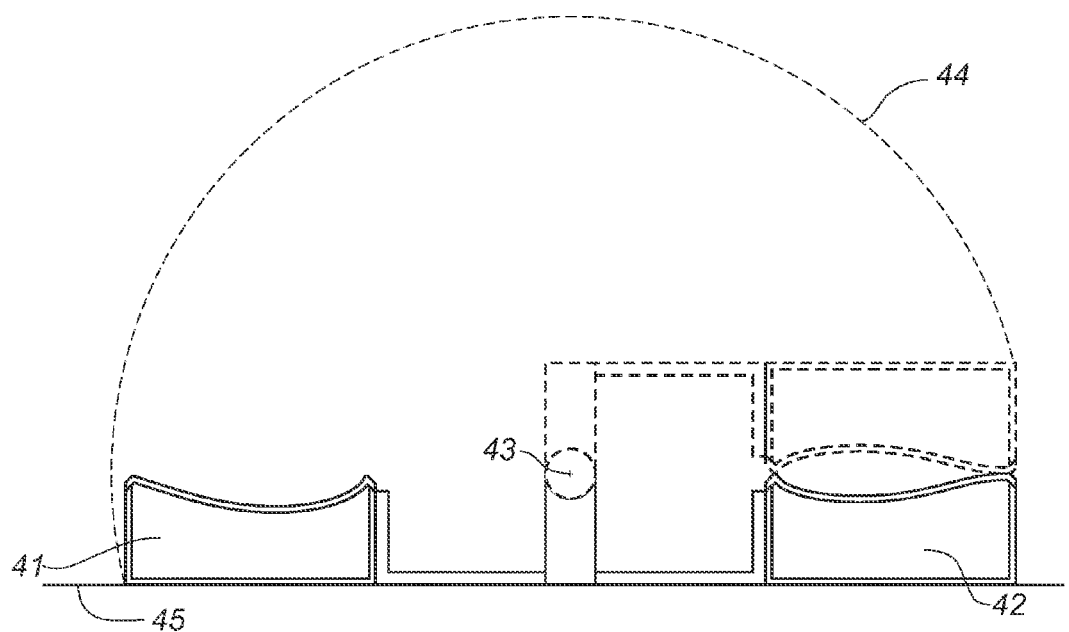
*Prior art*  Fig. 3

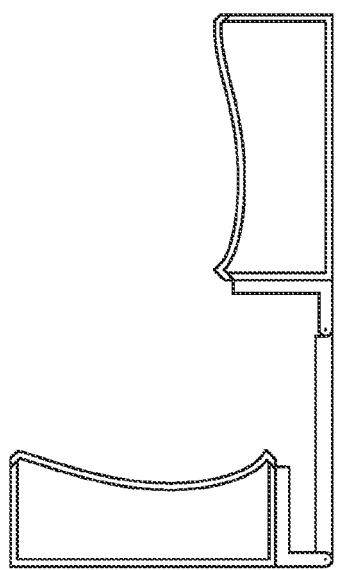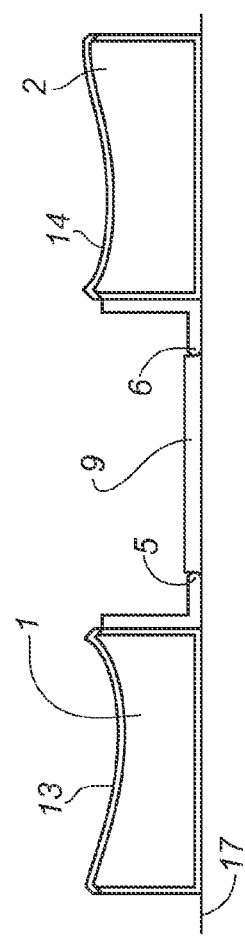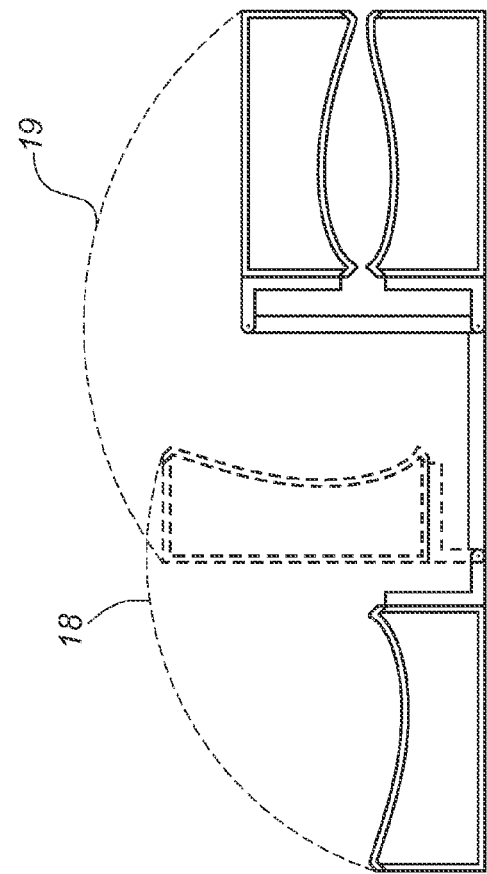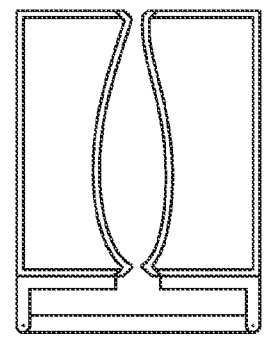

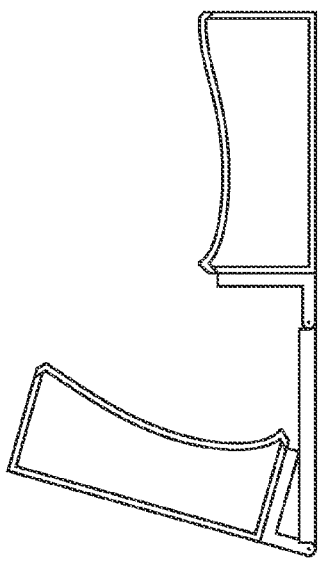
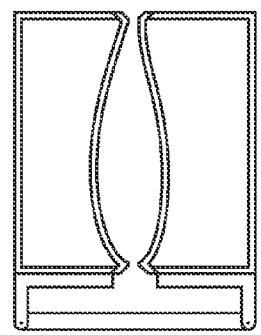
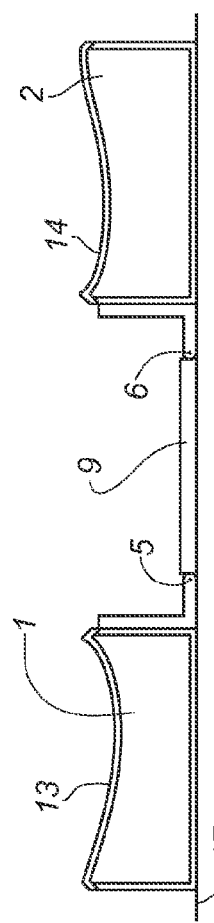
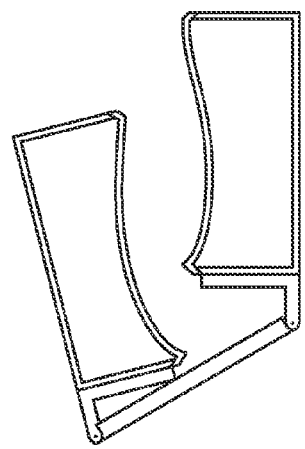
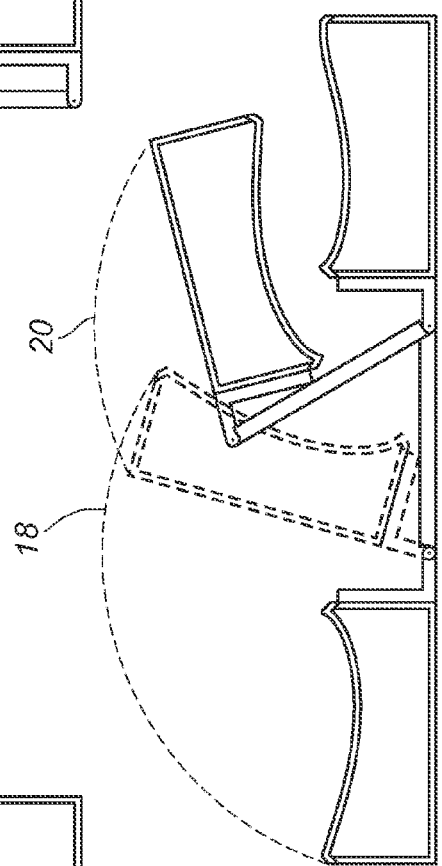

MOULD ASSEMBLY WITH HINGE MECHANISM AND METHOD FOR CLOSING A MOULD ASSEMBLY

TECHNICAL FIELD

The present invention relates to a mould assembly comprising a first and a second mould part for manufacturing a substantially elongated, closed profile member, in particular a wind turbine blade of fibre-reinforced polymer, said mould assembly further comprising a hinge mechanism, which is optionally detachably connected to the two mould parts. Furthermore, the invention relates to a method for closing such a mould assembly.

BACKGROUND ART

Wind turbine blades of fibre-reinforced polymer are usually manufactured in moulds, where the top side and the bottom side of the blade profile are manufactured separately by arranging glass fibre mats in each of the two mould parts. Then, the two halves are glued together, often by means of internal flange parts. Glue is applied to the inner face of the lower blade half before the upper blade half is lowered thereon. Additionally, one or two reinforcing profiles (beams) are often attached to the inside of the lower blade half prior to gluing to the upper blade half.

It is commonly known that moulds for making large articles such as wind turbine blades and consisting of two mould parts are closed about a longitudinal hinge line, where the hinges are passive, i.e. a crane is used to lift one of the mould parts about the hinge line for closure and opening of the mould. When making wind turbine blades, the mould is closed so as to glue two blade shell halves together, said shell halves being produced in separate mould parts.

DK 171.948B discloses a method for manufacturing turbine blades, where the two mould parts are hinged together along a hinge line coinciding with the finished leading edge of the blade. One disadvantage of said method and shape is that it is only suitable for manufacturing profiled members with a rectilinear edge coinciding with the hinge line of the mould. The closing procedure is not mentioned at all in this reference.

The Danish Utility Model BR 2004 00032 discloses an assembly, where a drive unit is built into the hinge structure lifting and turning one of the mould parts from a position, in which its opening faces upwards, to a position above the other mould part, in which the openings of the two mould parts face each other. The closure mechanism includes an additional assembly bringing the two mould parts together in a rectilinear movement by means of a parallel linkage mechanism. This curve linear or almost rectilinear closing movement is necessary when manufacturing wind turbine blades, since a complete closure by rotation is geometrically impossible unless the hinge axis is arranged at a disadvantageously large distance from the mould cavity.

WO 04/43679 discloses a mould assembly, where the above-mention rectilinear closing movement is accomplished by means of protractile guide rods mounted on one of the two mould parts along the two longitudinal sides extending parallel to the hinge lines, and associated bearing means along the longitudinal sides of the second of the two mould parts. This assembly allows for an assembly of the two mould parts with very high accuracy.

Wind turbine blades have become increasingly longer of the years and may reach up to 60 meters or even more today, which means that mould assemblies for moulding said blades have also become increasingly larger. This results in problems for prior art mould assemblies, since the mould part rotating with respect to the other one during closure of the mould assembly reaches a very great height during the rotary motion, which may mean that the height of the ceiling in the halls where the blades are manufactured must be very great. This means that the halls become more expensive to build, or that the ceilings in existing halls have to be raised, which of course also results in higher financial costs.

DISCLOSURE OF INVENTION

The object of the invention is to provide a mould assembly and a method for closing such a mould assembly, where the height necessary for carrying out the closing procedure is reduced with respect to the prior art.

According to the invention, this object is achieved by the hinge mechanism having at least a first and a second hinge axis extending with a mutual distance substantially parallel to the two mould parts in the longitudinal direction of the mould so that the mould parts are pivotable with respect to each other between a first, open position, where the two mould parts are located adjacent each other with a mutual distance and with the openings of the two mould parts facing substantially upwards, and a second position, where the first mould part is rotated around the first hinge axis by means of a first drive means so that the opening of said first mould part faces substantially to the side and towards the second mould part, and a third position, where the first mould part is further rotated around the second hinge axis by means of a second drive means so that the opening of said first mould part faces substantially downward towards the opening of the second mould part. Thus, the first mould part moves along two circular arcs instead of only a single one during the rotation process, thus allowing for a decrease of the maximum height of the rotation process compared to mould assemblies, where the movement is carried out around one axis only. Furthermore, a workspace is created between the two mould parts in the open position of the mould assembly, as they are positioned at a mutual distance.

According to a preferred embodiment of the invention, the first hinge axis and the second hinge axis are connected by means of at least one connecting arm. The connecting arm may consist of a plurality of individual arms or a plate extending in the longitudinal direction of the mould parts.

According to a particular embodiment, the at least one connecting arm extends horizontally in the first, open position of the mould assembly, preferably between the lower areas of the two mould parts.

Preferably, the at least one connecting arm rests on a common support of the two mould parts in the first, open position of the mould assembly. In this way, the connecting arm is as small an obstacle as possible in the workspace between the two mould parts.

According to a preferred embodiment of the mould assembly according to the invention, at least one guiding rail is mounted on the at least one connecting arm, said guiding rail extending substantially parallel to the longitudinal direction of the two mould parts in the first, open position of the mould assembly. Thus, a robot for the manufacture of wind turbine blades like the one disclosed in Danish Utility Model No. BA 2004 00032 can be controlled by means of the guiding rails along the mould parts.

According to a particular embodiment, the mould assembly further comprises displacement means for a rectilinear translational movement of the first mould part between the third position of the mould to a fourth closed position, where the two mould parts are closed together so that their inner surfaces substantially define the shape of the finished profile member. The rectilinear translational movement is most often necessary, because the dividing line along the leading edge and the trailing edge of a wind turbine blade extend as spatial curves, and unless the hinge axis is arranged at a disadvantageously large distance from the closest dividing line, a complete closure of the two mould parts is geometrically impossible.

According to a particular embodiment, the displacement means are provided by protractile guide rods mounted on one of the two mould parts along the two longitudinal sides thereof as well as by associated bearing means along the longitudinal sides of the second of the two mould parts for receiving the free ends of the guide rods so that the first mould part can rest on the guide rods in the third position of the mould, and where the guide rods comprise third drive means for displacing the guide rods and thus moving the two mould parts between the third and the fourth position of the mould. This provides a particularly simple embodiment of the displacement means.

Preferably, the guide rods are provided with individually controllable drive means. This results in very high accuracy for the closure process, since the extended length of the guide rods is adapted to the geometry of the mould parts. This ensures contact with the adhesive surfaces simultaneously over the entire length of the blade. This is highly advantageous in that the slightest contact between the mould parts prior to the final positioning often causes the applied adhesive to be partially scraped off.

The free ends of the guide rods and optionally the bearings may be conical, thus achieving better control, since the guide rods are guided into the bearings with a small eccentric displacement from the centre of the bearings due to their conical shape.

According to a particular embodiment of the invention, the first and/or the second drive means is a motor, preferably an electric motor. This is a particularly simple embodiment. A planet gear, for example, may be arranged between the motor and the hinge so that the speed of the electric motor on the output shaft can be converted into a suitable closing speed.

Alternatively, the first and/or the second drive means is a linear actuator, such as a cylinder/piston unit, which is preferably hydraulically driven, thereby providing a particularly simple and inexpensive embodiment. The drive means may also be spindle units. Preferably, the first drive means is connected between the first mould part and the connecting arm. Additionally, the second drive means is preferably connected between the second mould part and the connecting arm.

The object of the invention is also achieved by means of a method for closing a mould assembly comprising a first mould part, a second mould part and a hinge mechanism arranged there between, said mechanism comprising at least a first and a second hinge axis, by which method i) the first mould part by rotation around the first hinge axis rotates from a first, open position, where the two mould parts are positioned adjacent each other with a mutual distance and with the openings of the two mould parts facing substantially upwards, to a second position, where the opening of the first mould part faces substantially to the side and towards the second mould part, and ii) the first mould part by rotation around the second hinge axis rotates from the second position to a third position, where the openings of the two mould parts face each other.

Thus, the maximum height of the first mould part decreases during rotation compared to a closing method, where the first mould part is only rotated around one axis. In principal, the third position may be a position, where the two mould parts are completely closed.

According to a particular embodiment of the method, the first mould part is rotated substantially 90 degrees in step i) and additionally substantially 90 degrees in step ii). In this way and by means of two separate rotary motions, the first mould part can be moved to a position, where it is positioned substantially vertically above the second mould part.

According to a preferred embodiment, the first mould part is rotated more than 90 degrees in step i) and, subsequent to step ii), it is rotated around the first hinge axis in a direction opposite the rotary motion of step i) and further around the second hinge axis in the same direction as the rotary motion of step ii) to a position, where the first mould part is located substantially vertically above the second mould part. This enables a further decrease of the maximum height of the rotary motion. The two additional rotary motions may be carried out simultaneously or sequentially.

According to a preferred embodiment of the method, the second mould part is displaced substantially vertically from the third position or the position, where the first mould part is located substantially vertically above the second mould part, to a fourth, closed position, where the two mould parts are closed together.

BRIEF DESCRIPTION OF THE DRAWING

The invention is explained in detail below by means of embodiments illustrated in the drawing, in which FIG. 2 shows a first mould assembly according to the prior art with only a single hinge axis, FIG. 3 shows a second mould assembly according to the prior art with only a single hinge axis, FIG. 4 illustrates a first closing method for the mould assembly according to the invention, FIG. 5 illustrates a second closing method for the mould assembly according to the invention.

BEST MODES FOR CARRYING OUT THE INVENTION

The mould assembly according to the invention is particularly suitable for manufacturing a wind turbine blade, which is made by manufacturing two blade shell halves in separate mould parts and subsequently gluing the blade shell halves together. The blade shell halves per se are typically made by vacuum infusion, in which evenly distributed fibres, rovings, which are fibre bundles, bands of rovings or mats, which may be felt mats of single-fibres or woven mats of fibre rovings, are layered in a mould part and covered by a vacuum bag. By creating vacuum in the cavity between the inner face of the mould part and the vacuum bag, fluid polymer may be drawn into and fill the cavity containing the fibre material. When the polymer has cured, the vacuum bag is removed, and the two blade shell halves may be glued together along the edges and by means of one or more beams extending in the longitudinal direction of the blade between the inner faces of the two blade shell halves. The joining of the blade shell halves is effected by adhering one or more beams, flanges and the like to the blade shell half in one mould part, whereupon the joining faces are provided with glue, where the mould part with the other blade shell half is placed on top of the other mould part.

Figure 1:
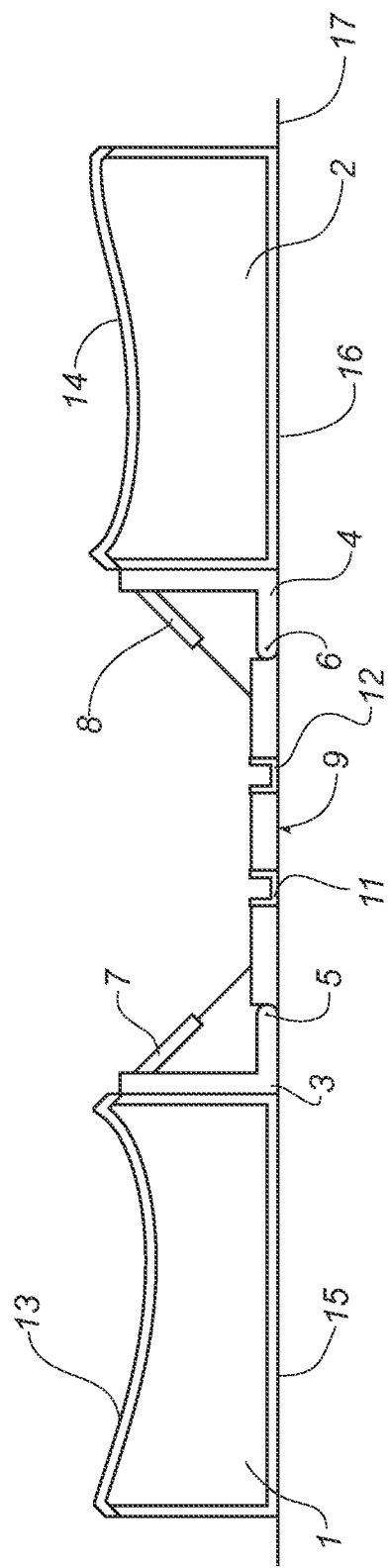
FIG. 1 shows a cross-sectional view through a mould assembly comprising first and a second mould part for a wind turbine blade.

FIG. 1 shows a mould assembly according to the invention in an open position. The mould assembly comprises a first mould part 1 and a second mould part 2, which in open position rest on a floor 17 or another surface. The first mould part 1 consists of a steel wire structure provided with a glass fibre shell having an inner surface 13, which has the shape of one of the sides of a wind turbine blade. The second mould part 2 consists also of steel wire structure provided with a glass fibre shell having an inner surface 14, which corresponds to the opposite side of the wind turbine blade.

The first mould part 1 is provided with a first hinge means 3, and the second mould part 2 is provided with a second hinge means 4. The two hinge means are pivotably hinged to each other by means of a connecting arm, which may be provided by a number of individual arms or a single continuous plate part so that the two mould parts 1, 2 are rotatable with respect to each other around a first hinge axis 5 and a second hinge axis 6.

The connecting arm 9 is provided with a first guide rail 11 and a second guide rail 12 to be used for controlling a first and a second blade robot, respectively. Guide rails may of course also be arranged on the other side of the first mould part 1 and the second mould part 2, respectively.

FIG. 2 shows a prior art mould assembly, where the two mould parts in the open position of the mould assembly are positioned immediately adjacent each other. A first mould part 31 is rotated with respect to a second mould part 32 around a hinge axis 33 arranged between the two mould parts at their upper edges from the open position of the mould assembly to a closed position, shown with dashed lines. During the rotary motion, the first mould part describes a circular arc 34. In the case of two mould parts with a width of for example 4 meters and a height of 2 meters, the apex of the circular arc 34 is approximately about 6.5 meters above the surface 35.

FIG. 3 shows a second prior art mould assembly, where the two mould parts in the open position of the mould assembly are positioned at a mutual distance. This embodiment is preferred over the embodiment shown in FIG. 2, since the mutual distance creates a workspace between the mould parts. As in FIG. 2, a first mould part 41 may be rotated with respect to a second mould part 42 around a hinge axis 43 arranged in the middle between the two mould parts 41, 42 and thus at a distance to the mould parts 41, 42. During the rotary motion, the first mould part 41 is rotated from the open position to a closed position, shown with dashed lines. During the rotary motion, the first mould part 41 describes a circular arc 44. Again, in the case of two mould parts with a width of for example 4 meters and a height of 2 meters, the apex of the circular arc 44 is approximately about 8.5 meters above the surface 45, if the hinge axis 44 is spaced 2 meters from the two mould parts 41, 42. The workspace between the two mould parts 41, 42 is thus 4 meters wide.

FIG. 4 illustrates a first method for closing the mould assembly according to the invention shown in FIG. 1. FIG. 4A shows the mould assembly in the open position of the mould assembly, where the two mould parts 1, 2 are positioned at a distance to each other and their openings face upwards. For the sake of clarity, the mould assembly is illustrated without drive means 7, 8. First, the first mould part 1 is rotated substantially 90 degrees around the first hinge axis 5 to a position shown in FIG. 4B, where the opening of the first mould part 1 faces substantially to the side and towards the second mould part 2. Then, the mould part 1 together with the connecting arm 9 is rotated substantially 90 degrees around the second hinge axis 6 to a position shown in FIG. 4C, so that the first mould part 1 is located substantially vertically above the second mould part 2, and the opening of the first mould part 1 faces substantially downward towards the opening of the second mould part 2. Subsequently and by means of a rectilinear translational movement, the first mould part 1 can be displaced to a closed position, where the two mould parts 1, 2 are closed together so that their inner surfaces 13, 14 substantially define the shape of the finished profile member.

The total movement of the first mould part 1 is shown in FIG. 4D. It can be seen that during the movement from the position shown in FIG. 4A to the position shown in FIG. 4B the mould part 1 describes a first circular arc 18. During the movement from the position shown in FIG. 4B to the position shown in FIG. 4C the mould part 1 describes a second circular arc 19. The apexes of the two circular arcs 18, 19 may be substantially decreased with respect to the mould assembly with only one hinge axis. Once again, in the case of two mould parts with a width of for example 4 meters and a height of 2 meters, and where the hinge axis 5, 6 are displaced by approx. 0.75 meters from the first mould part 1 and the second mould part 2, respectively, the apex of the circular arc 18 is approx. 5 meters from the surface 17 and the apex of the circular arc 19 approx. 6 meters. The workspace between the two mould parts 1, 2 is approx. 5 meters wide.

However, the maximum height can be further decreased. FIG. 5 illustrates a second method for closing a mould assembly according to the invention. FIG. 5A shows the mould assembly in the open position of the mould assembly, where the two mould parts 1, 2 are positioned at a distance to each other and where their openings face upwards, which corresponds to the position in FIG. 4A. The method shown in FIG. 5 differs from the method shown in FIG. 4 by the mould assembly being rotated more than 90 degrees around a first hinge axis 5 during the first rotary motion to a position shown in FIG. 5B, where the opening of the first mould part 1 substantially faces to the side, but also a little downward towards the second mould part 2. Then, the first mould part 1 together with the connecting arm 9 is rotated to a position shown in FIG. 5C, where the opening of the first mould part 1 substantially faces downward towards the opening of the second mould part 2, but where the openings are not positioned exactly on top of each other.

Subsequently, the first mould part 1 is rotated in a direction opposite to the first rotation around first the hinge axis 5 and then rotated further together with the connecting arm 9 around the second hinge axis 6 to a position shown in FIG. 5D, where the first mould part 1 is located substantially vertically above the second mould part 2, and the opening of the first mould part 1 faces substantially downward towards the opening of the second mould part 2. The two above-mentioned rotary motions may be carried out simultaneously or sequentially.

The total movement of the first mould part 1 during the rotation process is shown in FIG. 5E. It is seen that during the movement from the position shown in FIG. 5A to the position shown in FIG. 5B the mould part 1 describes a first circular arc 18 as in the method shown in FIG. 4. During the movement from the position shown in FIG. 5B to the position shown in FIG. 5C the first mould part 1 describes a third circular arc 20. The apex of the third circular arc may be lower than the apex of the first circular arc 18, which means that the maximum height may be reduced to 5 meters during the rotation process. Finally and by means of a rectilinear translational movement, the first mould part 1 may be displaced to a closed position, where the two mould parts 1, 2 are closed together so that their inner surfaces 13, 14 substantially define the shape of the finished profile member.

As seen in FIG. 5, it is advantageous to rotate the first mould part 1 as much as possible during the first rotary motion, so that the third circular arc 20 will be as low as possible and as close to the second hinge axis 6 as possible so that the apex of this circular arc will be lower than the apex of the first circular arc 18.

Figure 6:
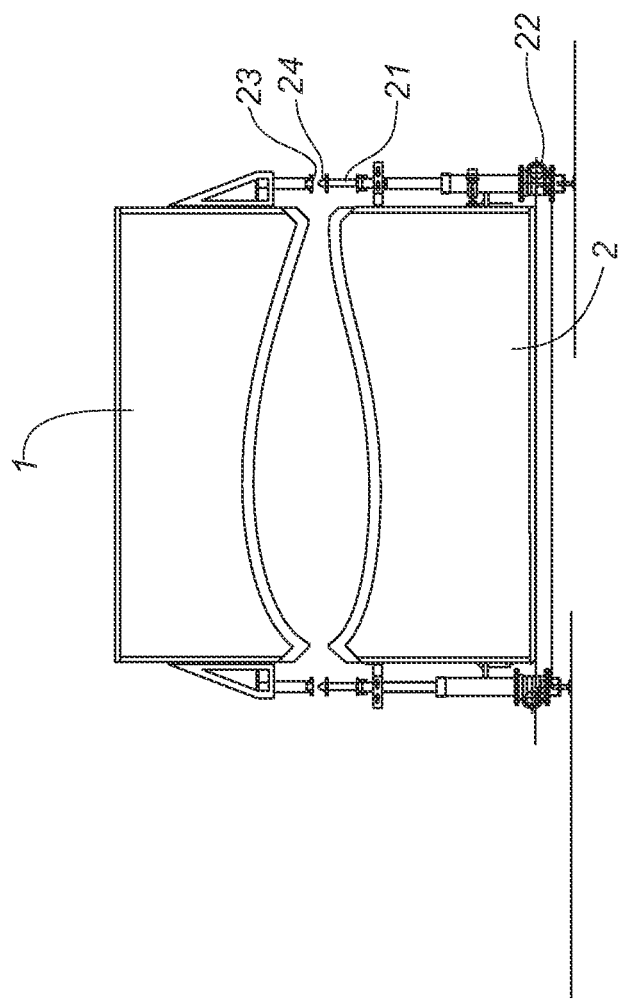
FIG. 6 shows a schematic illustration of a mould assembly provided with protractile guide rods.

FIG. 6 shows a simplified cross-sectional view through a mould assembly for a wind turbine blade in a partially closed position, where the first mould part 1 is located at a distance vertically above the second mould part 2. Along its longitudinal sides, which extend parallel to the first hinge axis 5, the first mould part 1 comprises a number of protractile guide rods 21, which are shown in a retracted and not yet activated position. Drive means 22 are provided at a lower end of the protractile guide rods 21 by use of which the guide rods 21 may be protracted and retracted.

The protractile guide rods 21 can be moved upward towards bearing means 23, which are mounted on the first mould part 1, and are adapted to receive the free ends 24 of the guide rods 21. The free ends 24 of the guide rods 21 and the bearing means 23 are conically shaped to guide the ends of the guide rods into reliable engagement with the bearing means 23.

Subsequently, the first mould part 1 can be disengaged from the hinge mechanism and now rests on the protractile guide rods 21 only. By lowering the guide rods 21, the first mould part 1 may now be guided with very high accuracy to a position (not shown), where the mould parts 1, 2 are made to engage each other along their edges, and in which position the two blade shell halves are glued together. When the glue has either completely or partially cured, the first mould part 1 is lifted again by means of the guide rods 21, and particularly advantageously, the portion of the first mould part 1 in the tip of the wind turbine blade may be lifted first to obtain a slip effect. Naturally, the number and position of the guide rods 21 and corresponding bearing means 23 depend on the mould length, which may be up to 60 m or even more. The drive means 22 of the guide rods 21 may be controlled individually to obtain the desired slip effect.

The invention has been described with reference to preferred embodiments. Many modifications are conceivable without thereby deviating from the scope of the invention. Modifications and variations apparent to those skilled in the art are considered to fall within the scope of the present invention. Embodiments are for example conceivable, where the mould parts are rotated around three or more hinge axes. It is also apparent that the mould assembly according to the invention may contain a plurality of hinge mechanisms in the longitudinal direction of the mould parts. It is also conceivable that the mould parts per se are detachably connected to the hinge mechanism(s). The hinge mechanisms may for example be fixed to e.g. the floor of a hall, where the wind turbine blades are manufactured, and the mould parts may be movable so that they can be moved and connected to the hinge mechanisms.

REFERENCE NUMERAL LIST 1 first mould part
2 second mould part
3 first hinge means
4 second hinge means
5 first hinge axis
6 second hinge axis
7 first drive means/hydraulic piston
8 second drive means/hydraulic piston
9 connecting arm
11 first guide rail
12 second guide rail
13 inner surface of the first mould form
14 inner surface of the second mould form
15 lower area of the first mould form
16 lower area of the second mould form
17 floor
18 first circular arc
19 second circular arc
20 third circular arc
21 guide rod
22 third drive means
23 bearing means
24 free end of the guide rod
31, 41 first mould part
33, 43 hinge axis
34, 44 circular arc

The invention claimed is:

1. A mould assembly for manufacturing a wind turbine blade, comprising:
two mould parts, a first mould part and a second mould part, for manufacturing a elongated closed profile member, including the wind turbine blade of fibre-reinforced polymer,
said mould assembly further comprising a hinge mechanism, which is detachably connected to the two mould parts,
the hinge mechanism further comprising at least a first hinge axis and a second hinge axis extending parallel to each other with a first mutual distance and parallel to the two mould parts in the longitudinal direction of the mould so that the mould parts are pivotable with respect to each other between
a first, open position, where the two mould parts are located adjacent each other with a second mutual distance and with the openings of the two mould parts facing upwards, and
a second position, where the first mould part is rotated around the first hinge axis by a first drive means so that the opening of said first mould part faces to the side and towards the second mould part, and
a third position, where the first mould part is further rotated from the second position around the second hinge axis by a second drive means so that the opening of said first mould part faces downward towards the opening of the second mould part and is aligned therewith, thereby defining a mould cavity configured for the elongated closed profile member, wherein:
the first mould part between the first and the second position describes a first circular arc,
the first mould part between the second and the third position describes a second circular arc,
the first mould part is rotated 180 degrees about the first and second hinge axes with respect to the second mould part,
the first hinge axis is located along a side of the first mould part and the second hinge axis is located along a side of the second mould part,
a workspace is created between the two mould parts in the first, open position of the mould assembly, and
the first mould part and the second mould part in the first, open position rest on a floor or another surface,
wherein the first hinge axis and the second hinge axis are connected by means of at least one connecting arm, wherein the at least one connecting arm includes a main plane that faces upward in the first and second positions, and faces towards the second mould part in the third position.

2. The mould assembly according to claim 1, wherein the at least one connecting arm extends horizontally in the first, open position of the mould assembly between the lower areas of the two mould parts.

3. The mould assembly according to claim 2, wherein the at least one connecting arm rests on a common support of the two mould parts in the first, open position of the mould assembly.

4. The mould assembly according to claim 1, comprising at least one guide rail mounted on the at least one connecting arm, said guide rail extending parallel to the longitudinal direction of the two mould parts in the first, open position of the mould assembly.

5. The mould assembly according to claim 1, the mould assembly further comprising displacement means for a rectilinear translational movement of the first mould part between the third position of the mould to a fourth closed position, where the two mould parts are closed together so that their inner surfaces define the shape of the finished profile member.

6. The mould assembly according to claim 5, wherein the displacement means comprise protractile guide rods mounted on one of the two mould parts along the two longitudinal sides thereof as well as by associated bearing means along the longitudinal sides of the other of the two mould parts for receiving the free ends of the guide rods so that the first mould part can rest on the guide rods in the third position of the mould, and where the guide rods comprise third drive means for displacing the guide rods and thus moving the two mould parts between the third and the fourth position of the mould.

7. The mould assembly according to claim 1, wherein the first and/or the second drive means comprise a linear actuator, including a cylinder/piston unit, which is hydraulically driven.

8. The mould assembly according to claim 1, wherein the first drive means is connected between the first mould part and the connecting arm.

9. The mould assembly according to claim 1, wherein the second drive means is connected between the second mould part and the connecting arm.

* * * * *